(12) United States Patent
Wilds et al.

(10) Patent No.: US 10,048,213 B2
(45) Date of Patent: Aug. 14, 2018

(54) SYSTEMS AND METHODS FOR COMPONENT IDENTIFICATION

(71) Applicant: Raytheon Company, Waltham, MA (US)

(72) Inventors: Andrew M. Wilds, Sahuarita, AZ (US); Philip C. Theriault, Tucson, AZ (US); Michael K. Burkland, Tuscon, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/336,020

(22) Filed: Oct. 27, 2016

(65) Prior Publication Data

US 2018/0120239 A1    May 3, 2018

(51) Int. Cl.
| | |
|---|---|
| *H01J 49/26* | (2006.01) |
| *G01N 23/00* | (2006.01) |
| *H01J 49/00* | (2006.01) |
| *G01N 23/22* | (2018.01) |
| *B29C 67/00* | (2017.01) |
| *B33Y 10/00* | (2015.01) |
| *B33Y 50/00* | (2015.01) |
| *B33Y 70/00* | (2015.01) |
| *B29K 105/00* | (2006.01) |

(52) U.S. Cl.
CPC ....... *G01N 23/005* (2013.01); *B29C 67/0088* (2013.01); *B33Y 10/00* (2014.12); *B33Y 50/00* (2014.12); *B33Y 70/00* (2014.12); *G01N 23/22* (2013.01); *H01J 49/0031* (2013.01); *B29K 2105/0052* (2013.01); *G01N 2223/106* (2013.01); *G01N 2223/1013* (2013.01); *G01N 2223/505* (2013.01)

(58) Field of Classification Search
CPC ............. G01N 23/005; G01N 23/22; G01N 2223/1013; G01N 2223/106; G01N 2223/505; B33Y 10/00; B33Y 50/00; B33Y 70/00; B29C 67/0088; H01J 49/0031; B29K 2105/0052
USPC ...... 250/281, 282, 283, 288; 702/19, 22, 27, 702/28
See application file for complete search history.

(56) References Cited

U.S. PATENT DOCUMENTS

| | | |
|---|---|---|
| 3,149,233 A | 9/1964 | Wilson et al. |
| 5,410,152 A | 4/1995 | Gadeken |
| 5,760,394 A | 6/1998 | Welle |
| 2007/0099251 A1* | 5/2007 | Zhang .................. G01N 33/574 435/7.23 |
| 2010/0222917 A1 | 9/2010 | Bohlig et al. |

(Continued)

OTHER PUBLICATIONS

Gygi, et al., "Quantitative analysis of complex protein mixtures using isotope-coded affinity tags" Nature Biotechnology vol. 17 Oct. 1999; pp. 994-999 (6 pages).

(Continued)

*Primary Examiner* — Nicole Ippolito
(74) *Attorney, Agent, or Firm* — Cantor Colburn LLP (57) ABSTRACT

A method of forming of an item includes: selecting a component of the item that is formed of an element; mixing one or more identifiable additives with the element; forming the component with the mixture; performing an atomic level test on at least a portion of the component; and recording the results of the test.

9 Claims, 6 Drawing Sheets

(56) References Cited

U.S. PATENT DOCUMENTS

2014/0120565 A1* 5/2014 Coon ................ G01N 33/6848
  435/23

OTHER PUBLICATIONS

Hu, et al. "Detection of Multiple Proteins on One Spot by Laser Ablation Inductively Coupled Plasma Mass Spectrometry and Application to Immuno-Microarray with Element-Tagged Antibodies" Anal. Chem. 2007, 79, 923-929 (7 pages).
RAMREG-001-98 "Radioactive Material Regulations Review" U.S. Department of Transportation, Research and Special Programs Administration. (82 pages).

* cited by examiner

SYSTEMS AND METHODS FOR COMPONENT IDENTIFICATION

BACKGROUND

The present disclosure relates identification techniques and, more particularly, to component identification.

Counterfeit products are a large problem faced by producers and consumers of items. The items can be inferior quality and lead to defects in systems into which the items are integrated.

For example, the threat of counterfeit electronics injected into the supply chain supporting the US defense industry is widely appreciated. With the proliferation of capabilities in Advanced Manufacturing (AM) technologies, there is an increasing risk of counterfeit materials into the AM domain as well. According to the President's Council of Advisors on Science and Technology Report to the President on Ensuring American Leadership in Advanced Manufacturing, Advanced Manufacturing technology is "a family of activities that (a) depend on the use and coordination of information, automation, computation, software, sensing, and networking, and/or (b) make use of cutting edge materials and emerging capabilities enabled by the physical and biological sciences, for example nanotechnology, chemistry, and biology. This involves both new ways to manufacture existing products, and especially the manufacture of new products emerging from new advanced technologic."

AM technologies includes but is not limited to, for example, additive manufacturing such as 3-D printing and cold spraying. Even in the defense industry, components and parts have been discovered being injected into supply chains supporting defense related products. This threat is real and may arise in the context of electronic components such as microchips and integrated circuits integrated into defense related products. Further, as the capability of counterfeiters increases, will increasingly provide novel, and critical, products beyond the realm of electronics.

Given the criticality that components in the defense industry are authentic, the need for more advanced methods of differentiating between real and counterfeit components is ever increasing. As such, more robust identification systems/methods would be well received.

SUMMARY

According to one embodiment, a method of forming of an item made from at least one component so that the authenticity of the item can later be verified is disclosed. The method includes: selecting a component of the item that is formed of at least one element; mixing one or more identifiable additives having an atomic level characteristic different from the at least one element, with the at least one element to create a mixture; forming the component with the mixture; performing an atomic level test on at least a portion of the component to determine the atomic level characteristic of the component; and recording the results of the test.

According to one embodiment, a method of verifying the authenticity of an item made from at least one element is disclosed. The method includes: receiving the results of an a first atomic level test on the item, the item having had one or more identifiable additives having an atomic level characteristic different from the at least one element introduced therein; performing a second atomic level test on the item to determine the atomic level characteristic of the item; and comparing results of the first and second atomic level tests to determine the authenticity of the item.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be discussed below, embodiments disclosed herein provide for determinations of whether an item is authentic or counterfeit. In all cases, one or more isotopes are added to the item. These isotopes may have unique properties that can be identified by specialized machines. Briefly, one or more of a stable isotope, a gamma ray emitting isotope and/or a neutron scattering/capturing isotope may be introduced into the item. These types of isotopes shall be referred to as generally as "identifiable additives" herein.

As described further below, each of these "identifiable additives" may provide a unique signature for an item that may be observed by, for example, mass spectrometry, a gamma ray detector (e.g., a scintillation detector) or a device that subjects the item to neutrons and can detect the capture or scattering of neutrons (e.g., a neutron spectrum analyzer). The mass spectrometry or scintillation detection (with or with neutron bombardment) shall be referred to generally as "atomic level measurements."

In one embodiment, an approach to countering counterfeiting threats at the most fundamental level for AM includes embedding isotopic signatures into the raw materials—a spectroscopic signature with inconsequential impact to the mechanical, chemical or electrical performance of an AM product. The approach would enable a high degree of authentication to AM products while increasing the cost barrier to counterfeit agents with minimal cost impact at manufacture. To that end, certain embodiments may have the technical effect of providing method hidden from the counterfeiter such that it is not easily replicated and, even if discovered, that would increase the cost to the counterfeiter for fabricating a credible product which can successfully pass through the supply chain and into a final product such as a defense product.

It shall be understood that in certain instances, products that may be formed by AM include electronic items such as microchips and integrated circuits. While such elements are given as examples herein, the techniques and methods disclosed herein may be used, in whole or in part, with many materials whether it is electrically active or not. Further it shall also understood that while AM is described as one manufacturing method, the teachings herein are applicable to any type of manufacturing. As such, unless specifically stated, AM techniques are not required in the appended claims.

Figure 1:
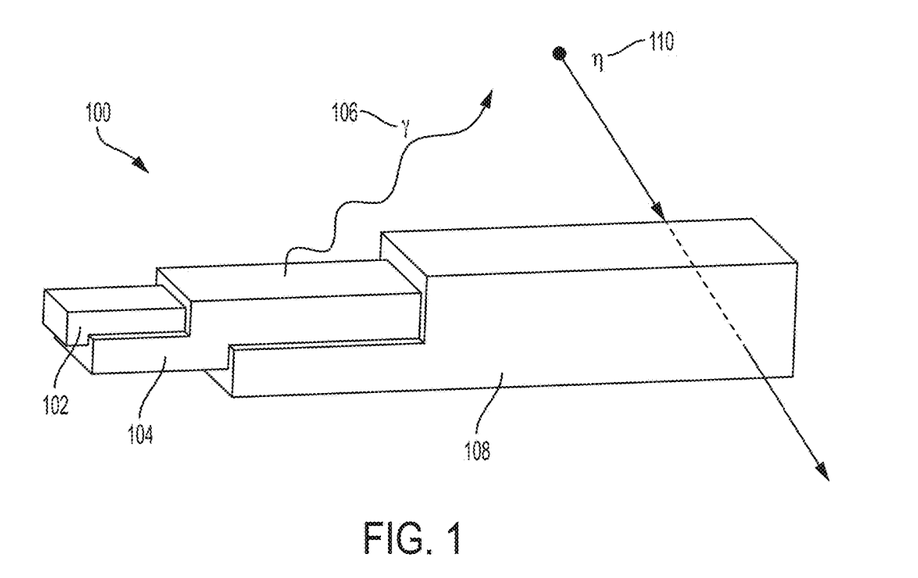
FIG. 1 is a perspective view of an item that includes a combination of layers formed by the identification techniques disclosed herein.

FIG. 1 shows a perspective view of an item 100 that has been created such that in includes all three of the identifiable additives. This item 100 is exemplary only and provides three different identifiable additive anti-counterfeiting measures but only one is required in some embodiments and other embodiments may only include two of them. Of course, any number of types of identifiable additives could be provided.

The item includes a functional element 102 that can be, for example, an integrated circuit. Of course, the functional element 102 is not limited in this manner and could be any type of element. The functional element 102 is encapsulated by a gamma ray emitting layer 104. As more fully described below, the gamma rays 106 emitted by this layer can be used to authenticate the item 100. An outer layer 108 is also provided. This layer can included one or more stable isotopes in one embodiment. As discussed further below, spectrographic analysis of this layer can be used to authenticate the item 100. The outer layer 108 can also include one or more neutron attenuating (either absorbing or scattering) elements. Application of neutrons 110 through the layer 108 may create an identifiable response that is measurable by a spectrum analyzer that may also be used to authenticate the item 100.

Figure 2:
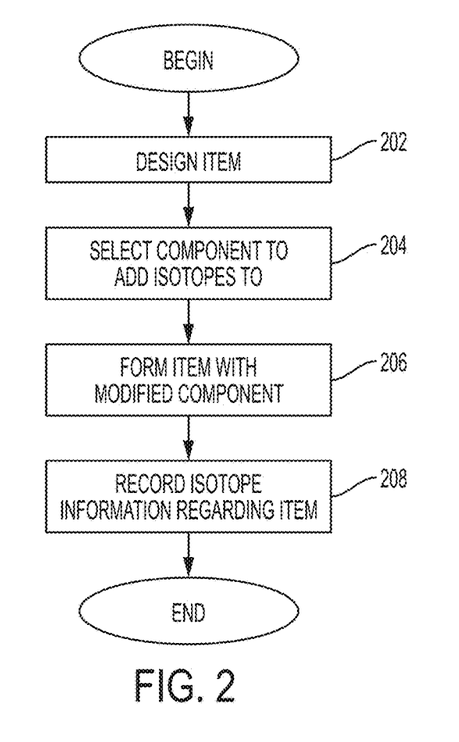
FIG. 2 is flow chart describing one method by which authentic items may be created.

FIG. 2 is a flow chart illustrating a method of forming an item according to one embodiment. At block 202, the process begins by designing an item. The item may be, for example, an electronic component. The item will include one or more components such as a metal or a plastic. For example, the component may be the conductive metal traces used to connect portions of electronic circuit to other portions (e.g., wires or external connections) or a plastic or other material used to encapsulate a microchip.

At block 204 one or more of the components are selected to have variations in the isotopic composition introduced. For instance, if the element is an external metal connection (e.g., a solder bump), such connections are formed of solder containing certain metals. Isotopes could be added to the solder and then used to identify the chip. This process is further described below.

Once established upon production from a trusted supplier, the unique isotopic composition can be verified by an end user via traditional mass spectrometry analyses using designed sample specimens engineered into the fabrication. The nature of the signature cannot be detected without a potential counterfeiter having like technologies of isotopic analysis; and even with that, counterfeiting the exact isotopic ratios across the many candidate species would be prohibitively expensive.

In more detail, isotopic signatures are a most powerful method for identification, classification and forensics in many scientific, engineering fields and of study. Each element in the periodic table is chemically ordered based on the number of protons in the nucleus (e.g., Oxygen has 8 protons, Carbon has 12, etc . . . ). However, the number of neutrons occurring in any one of these elements can vary in quantity, giving rise to higher or lower atomic mass of a given elemental isotope to another; $^{16}O$ has 8 protons and 8 neutrons, while $^{17}O$ has 9 neutrons, and so on.

Throughout the periodic table, there are numerous stable isotopes for many, but not all, of the elements (e.g., copper only has one stable isotope). From this population of stable isotopes, there exists a natural abundance composition for the earth. This means that for any raw materials used for manufacturing an item, the composition of stable isotopes of the constituent elements will be consistent. It is the isotopic variation from natural abundance (e.g., found in certain geologic formation, meteorites and nuclear fuels) that provide valuable information to scientific investigations (terrestrial vs. extraterrestrial sources of rocks) and engineering considerations (heavy water nuclear reactors) and is of interest here.

Isotopic composition is typically designated by the percentage of abundance of the element found in nature, or sometimes the ratio of a given isotope to the most abundant isotope of the parent element. For instance, $^4He$ is the most abundant stable isotope of the noble gas Helium compared to the only other stable isotope $^3He$; the percent abundance is 99.999863% and 0.000137%, respectively. As will be apparent from the above, the process at block 206 includes introduction of stable isotopic variations in metal compounds and/or plastics used at various stages of fabrication. Of course, the isotopes could be introduced into any type of material. For instance, the isotopes could be added to glasses (lenses or fibers), alloys, composites, gels, liquids, colloids, et al. In short, if the material is made of atoms, it can be tagged (e.g., have isotopes added to it).

At block 206, the item is formed with the modified metal or plastic. This may include, for example, forming a housing for a chip with plastics that include the additional isotopes. The modified metal or plastic includes, in one embodiment, stable isotopes to the element to form a mixture and such that the mixture has an artificially augmented relative frequency of stable isotopes in the material. This level to which the relative frequencies are altered from naturally occurrences will provide a unique "code" for each element. In one embodiment, the only additional materials added are isotopes of the primary material. This approach is unique in that it uses the base material as a coded "tag" rather than adding in a unique, foreign tagging element at trace concentrations.

At block 208, the ratio of the isotopes and primary element is recorded. This may include measuring the product or may be based on a priori knowledge of the isotopes used in the formation of the metal/plastic of the element.

Figure 3:
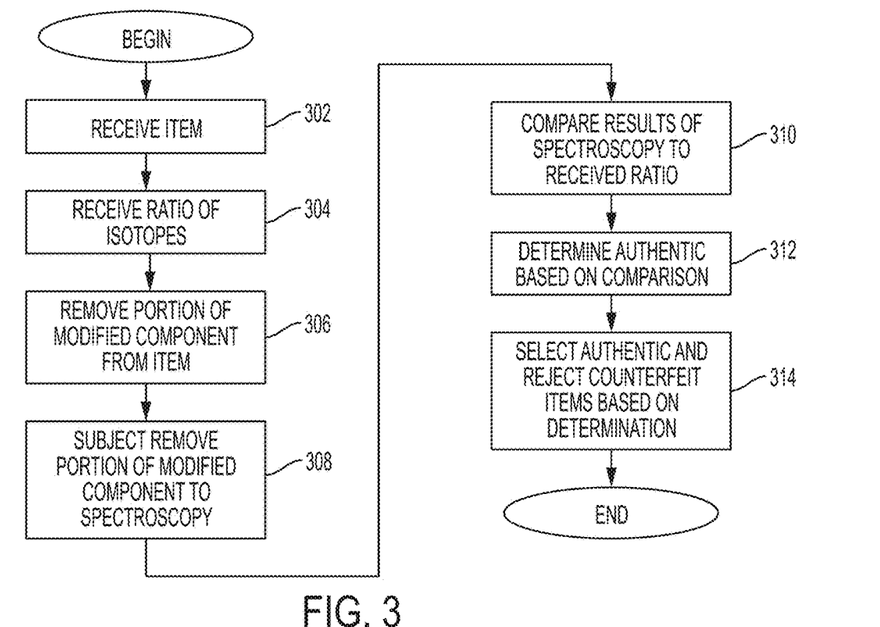
FIG. 3 is flow chart describing a method of authenticating the items made according to FIG. 2.

FIG. 3 is flow chart of method of verifying the authenticity of a part formed according to the method of FIG. 2. At block 302 the item is received. At block 304 information regarding the ratio of the isotopes in the item (e.g., in the modified component of the item recorded in block 208) is received. This information is kept secret from those not involved in the supply chain in one embodiment. At block 306 a portion of the modified component is removed from the item. For example, if the modified component is the housing of microchip, a portion the housing could be scraped off.

At block 308, the removed portion is analyzed. The analysis may be conducted, for example, via a mass spectrometer via a Rutherford backscattering spectrometry (RBS) device. Of course, other types of spectrometry could be used.

At block 310 the results of the spectroscopy are compared to the received ratio of isotopes (block 304). At block 312, a determination is made as to whether the item is authentic based on the comparison. That is, if the results match the received ratio, the item is authentic and, otherwise, it is not. At block 314 authentic items are selected and/or counterfeit items are rejected based on the comparison.

Figure 4:
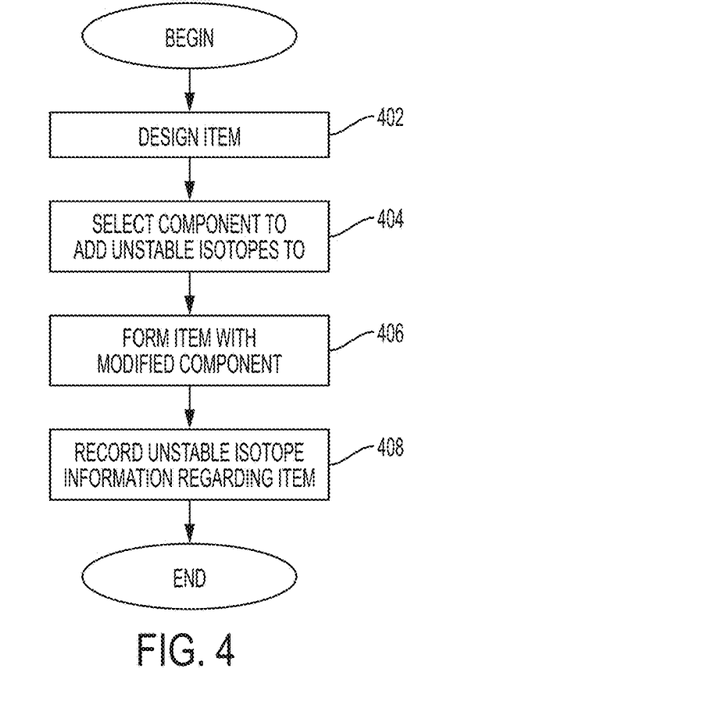
FIG. 4 is flow chart describing one method by which authentic items may be created.

FIG. 4 is a flow chart illustrating a method of forming an item according to one embodiment. The method of FIG. 4 may be performed in combination with the method of FIG. 2. That is, the item may be designed such that it includes the isotopes of the method of FIG. 2 and the gamma ray emitting elements discussed below. Of course, the methods of FIGS. 2 and 4 could be performed separately.

At block 402, the process begins by designing an item. The item may be, for example, an electronic component. The item will include one or more components such as a metal or a plastic. For example, the component may be a conductive metal traces used to connect portions of electronic circuit to other portions (e.g., wires or external connections) or a plastic or other material used to encapsulate a microchip.

At block 404 one or more of the components a selected to have a gamma ray emitting element (e.g., unstable isotope) added to it. This alteration may allow for a non-invasive method of identifying a particular item. The gamma ray emitting elements can be unstable isotopes or one or more metastable isotopes with a characteristic fraction of events emitting gamma rays of a specific energy.

Beyond the stable isotopes described above, the metals of plastics described above, may also include gamma ray emitting radioactive isotopes. They may be of the same element that forms the component in one embodiment but that is not required. The isotopes may be relatively short-lived radioactive isotopes and may be added in just about any range includes the range of parts per million to fractional parts per billion. Each isotope may produce a characteristic energy (or energies) for the photons emitted. It is this spectral character of the outputs that allows identification of specific nuclear material that is in the item.

Once established upon production from a trusted supplier, the unique spectrum can be verified by an end user via a scintillation detector. The nature of the signature cannot be detected without a potential counterfeiter having like technologies of spectrum analysis.

At block 406, the item is formed with the modified metal or plastic. This may include, for example, forming a housing for a chip with plastics that include the additional unstable isotopes. Of course, this step may include first forming a mixture of the original metal/plastic and the additional unstable isotopes.

At block 408, the spectral energies of the unstable isotopes are recorded. This may include measuring the product or may be based on a priori knowledge of the unstable isotopes used in the formation of the metal/plastic of the component. The test may be performed by a spectral analyzer.

Figure 5:
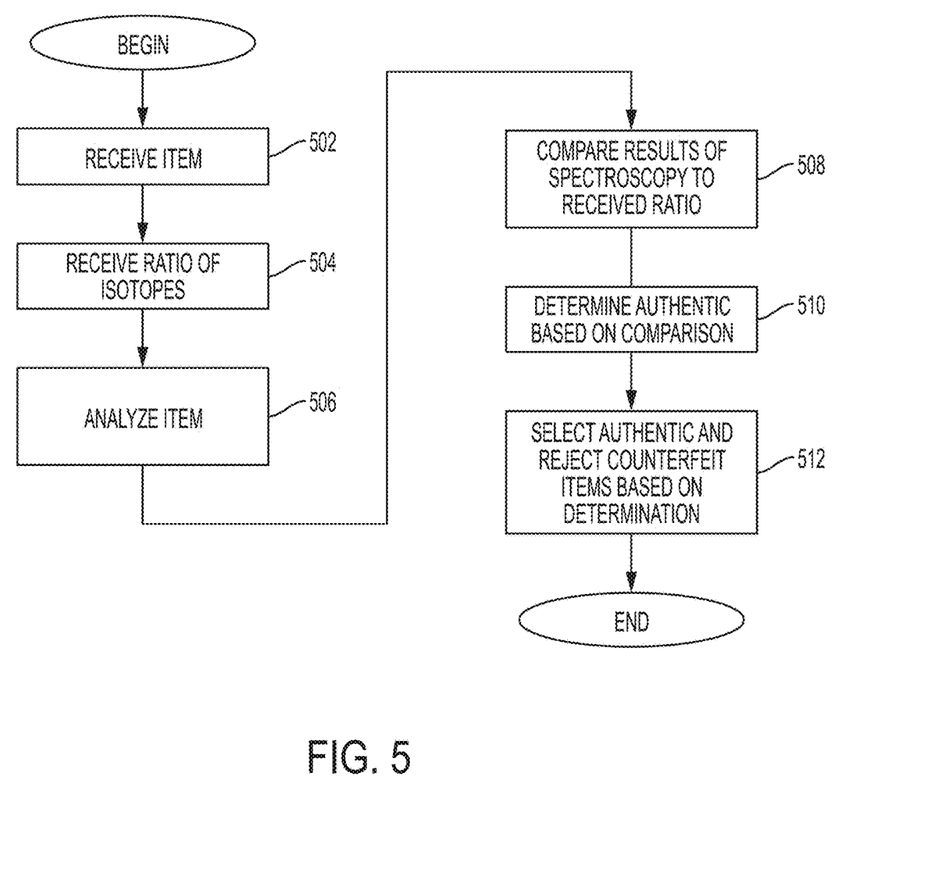
FIG. 5 is flow chart describing a method of authenticating the items made according to FIG. 4.

FIG. 5 is flow chart of method of verifying the authenticity of a part formed according to the method of FIG. 4. At block 502 the item is received. At block 304 information regarding the spectral content of the added isotopes in the item (e.g., in the modified component of the item recorded in block 408) is received. This information is kept secret from those not involved in the supply chain in one embodiment. At block 506 the item is subject to an analysis by a spectrographic device such as a scintillation detector.

At block 508 the results of the spectrum analysis are compared to the received spectral content information (block 504). At block 510, a determination is made as to whether the item is authentic based on the comparison. That is, if the results match the received information, the item is authentic and, otherwise, it is not.

At block 512 authentic items are selected and/or counterfeit items are rejected based on the comparison.

Figure 6:
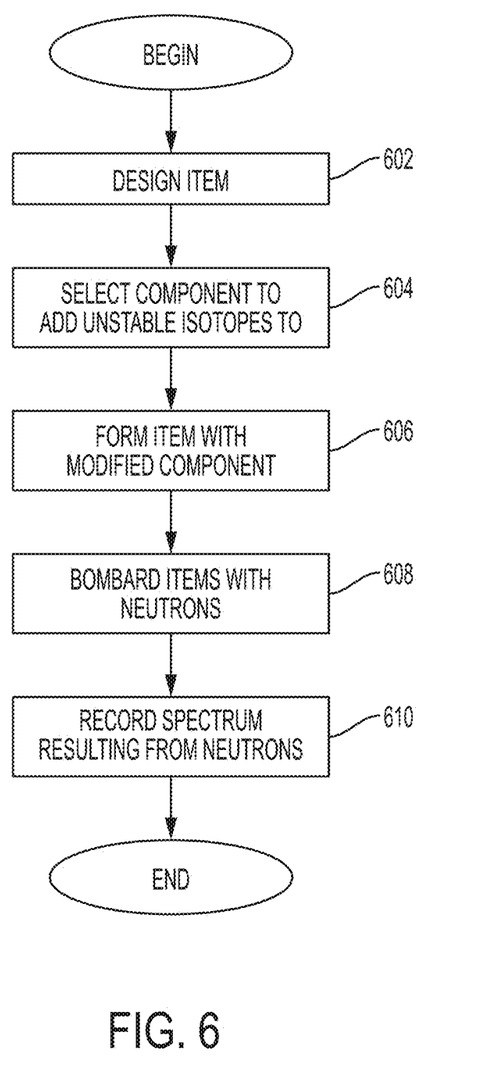
FIG. 6 is flow chart describing one method by which authentic items may be created.

FIG. 6 is a flow chart illustrating a method of forming an item according to one embodiment. The method of FIG. 4 may be performed in combination with one or both of the methods of FIG. 2 and FIG. 4. That is, the item may be designed such that it includes the isotopes of the method of FIG. 2 and the gamma ray emitting elements of FIG. 4 and/or the neutron scattering/absorbing elements discussed below. Of course, the methods of FIGS. 2, 4 and 6 could be performed separately. Further, as there are some overlapping steps in FIGS. 2, 4, and 6, the overlapping step may need to only be performed once.

At block 602, the process begins by designing an item. The item may be, for example, an electronic component. The item will include one or more components such as a metal or a plastic. For example, the component may be a conductive metal traces used to connect portions of electronic circuit to other portions (e.g., wires or external connections) or a plastic or other material used to encapsulate a microchip.

At block 604 one or more of the components are selected to have a neutron scattering or absorbing element added to it. This alteration may allow for a non-invasive method of identifying a particular item. Examples of such elements that could be added include but are not limited to: Boron$^{10}$, Erbium, Gadolinium, Molybdenum, Titanium, Ytterbium, Cadmium, Dysprosium, Europium, Hafnium, Samarium and Xenon. Once established upon production from a trusted supplier, the unique spectrum can be verified by an end user via a scintillation detector when the item is bombarded by impinging neutrons. The nature of the signature cannot be detected without a potential counterfeiter having like technologies of spectrum analysis.

At block 606, the item is formed with the modified metal or plastic. This may include, for example, forming a housing for a chip with plastics that include the additional neutron affecting elements. Of course, this step may include first forming a mixture of the original metal/plastic and the additional neutron affecting elements.

At block 608, a test is performed on the item that includes bombarding the item with neutrons that may be of known type. At block 610, the resulting spectrum is observed and recorded.

Figure 7:
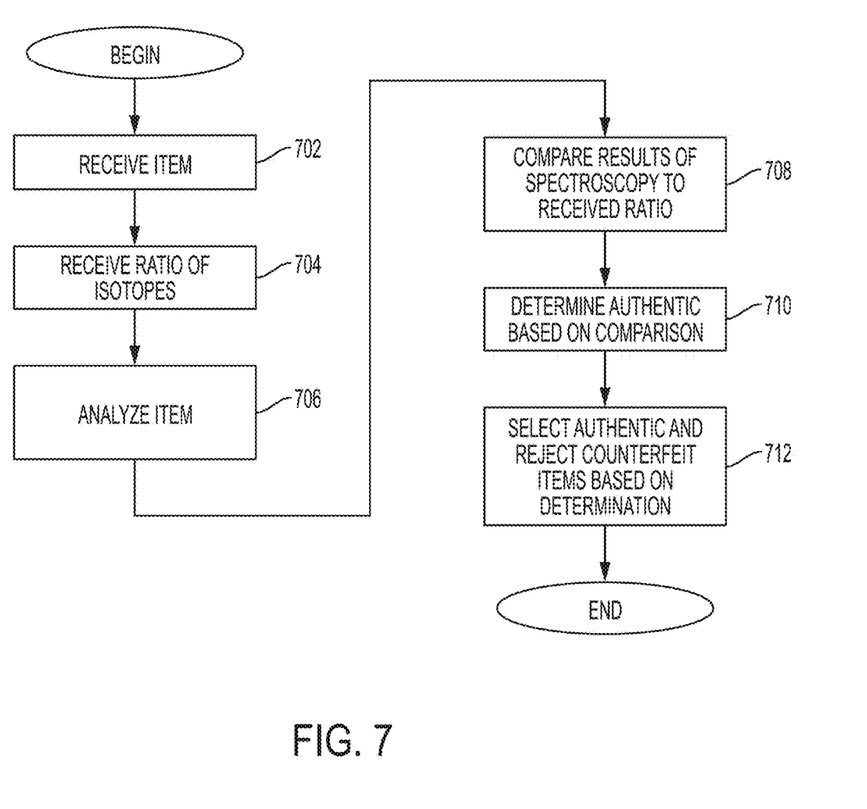
FIG. 7 is flow chart describing a method of authenticating the items made according to FIG. 6.

FIG. 7 is flow chart of method of verifying the authenticity of a part formed according to the method of FIG. 6. At block 702 the item is received. At block 704 information regarding the spectrum received when the item is bombarded with neutrons is received (e.g., in the modified component of the item recorded in block 610). This information is kept secret from those not involved in the supply chain in one embodiment. At block 706 the item is subject to an analysis by a spectrographic device that can bombard the item with neutrons and then read the resulting spectrum such as a scintillation detector.

At block 708 the results of the spectrum analysis are compared to the received spectral content information (block 704). At block 710, a determination is made as to whether the item is authentic based on the comparison. That is, if the results match the received information, the item is authentic and, otherwise, it is not.

At block 712 authentic items are selected and/or counterfeit items are rejected based on the comparison.

Figure 8:
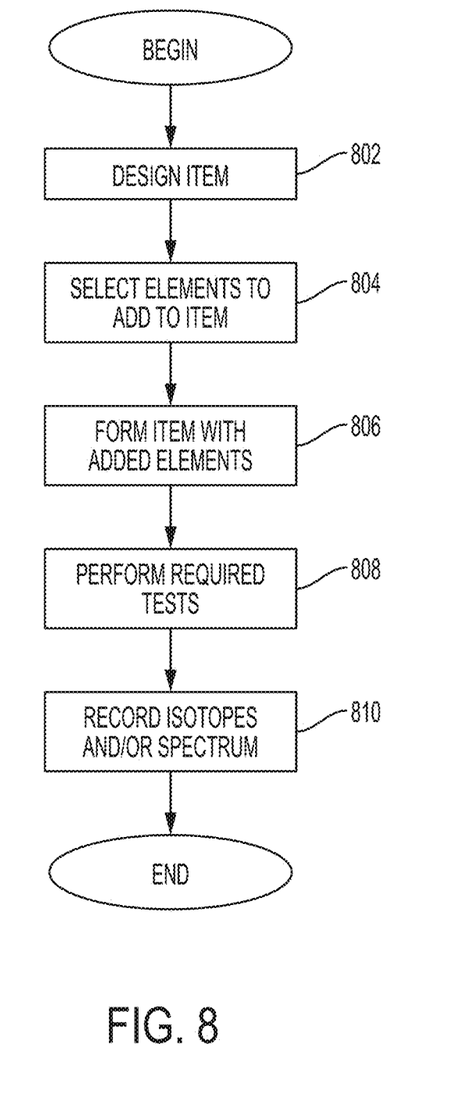
FIG. 8 is flow chart describing a method that may combine one or more of the methods previously described.

In the above description three different methods of forming and testing components have been disclosed. Based on the teachings herein, the skilled artisan will realize that the methods could be combined to some extent. For instance, and with reference now to FIG. 8, a particular item may be designed (block 802) and one or more additional elements may be added to the item (block 804). These elements may include, for example, any of the elements described above such as stable isotopes, gamma emitting isotopes and/or neutron scattering/trapping elements. At block 806 item is formed with the combination of additional elements. At block 808 tests may be performed on the resulting the item. The tests may include one or more of mass spectrometry, gamma ray detection and/or neutron scattering or absorption tests. The results are recorded (block 810) and then can be used in subsequent tests to verify authenticity as described above.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of forming of an item made from at least one component so that the authenticity of the item can later be verified, the method comprising:
    selecting a component of the item that is formed of at least one element;
    mixing one or more identifiable additives having an atomic level characteristic different from the at least one element, with the at least one element to create a mixture;
    forming the component with the mixture;
    performing an atomic level test on at least a portion of the component to determine the atomic level characteristic of the component; and
    recording the results of the test;
    wherein the one or more identifiable additives are unstable isotopes or one or more metastable isotopes with a characteristic fraction of events emitting gamma rays of a specific energy.

2. The method of claim 1, wherein the atomic level test is spectrum analysis.

3. The method of claim 2, wherein the spectrum analysis is gamma spectroscopy.

4. The method of claim 1, wherein the test includes both a mass spectrometry test and a spectrum analysis.

5. A method of forming of an item made from at least one component so that the authenticity of the item can later be verified, the method comprising:
    selecting a component of the item that is formed of at least one element;
    mixing one or more identifiable additives having an atomic level characteristic different from the at least one element, with the at least one element to create a mixture;
    forming the component with the mixture;
    performing an atomic level test on at least a portion of the component to determine the atomic level characteristic of the component; and
    recording the results of the test;
    wherein the one or more identifiable additives are neutron capturing or neutron scattering elements;
    wherein the atomic level test is neutron spectroscopy and is performed after the item is bombarded by neutrons.

6. A method of verifying the authenticity of an item made from at least one element, the method comprising:
    receiving the results of an a first atomic level test on the item, the item having had one or more identifiable additives having an atomic level characteristic different from the at least one element introduced therein;
    performing a second atomic level test on the item to determine the atomic level characteristic of the item; and
    comparing results of the first and second atomic level tests to determine the authenticity of the item;
    wherein the one or more identifiable additives are unstable isotopes or one or more metastable isotope with a characteristic fraction of events emitting gamma rays of a specific energy.

7. The method of claim 6, wherein the first and second atomic level tests are is spectrum analysis.

8. The method of claim 7, wherein the spectrum analysis is performed by a scintillation detector.

9. A method of verifying the authenticity of an item made from at least one element, the method comprising:
    receiving the results of an a first atomic level test on the item, the item having had one or more identifiable additives having an atomic level characteristic different from the at least one element introduced therein;
    performing a second atomic level test on the item to determine the atomic level characteristic of the item; and
    comparing results of the first and second atomic level tests to determine the authenticity of the item;
    wherein the one or more identifiable additives are neutron capturing or neutron scattering elements;
    wherein the first and second atomic level tests are spectrum analysis;
    wherein the spectrum analysis of the first and second atomic level tests are is performed after the item is bombarded by neutrons.

* * * * *